(12) United States Patent
Wynkoop et al.

(10) Patent No.: US 10,513,263 B2
(45) Date of Patent: Dec. 24, 2019

(54) RETARDING SYSTEM AND LOCK-UP CLUTCH ENGAGEMENT CONTROL

(71) Applicant: Caterpillar Inc., Peoria, IL (US)

(72) Inventors: Christopher Lewis Wynkoop, Eureka, IL (US); Matthew Michael Tinker, Peoria, IL (US); Abhishek Awana, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 106 days.

(21) Appl. No.: 15/810,716

(22) Filed: Nov. 13, 2017

(65) Prior Publication Data

US 2019/0143979 A1    May 16, 2019

(51) Int. Cl.
| | |
|---|---|
| *B60W 30/18* | (2012.01) |
| *F16H 61/14* | (2006.01) |
| *F16D 48/06* | (2006.01) |
| *B60W 10/02* | (2006.01) |
| *B60W 10/11* | (2012.01) |
| *F16H 59/54* | (2006.01) |

(52) U.S. Cl.
CPC .... *B60W 30/18109* (2013.01); *B60W 10/023* (2013.01); *B60W 10/11* (2013.01); *F16D 48/06* (2013.01); *F16H 61/143* (2013.01); *B60W 2300/17* (2013.01); *B60W 2510/1005* (2013.01); *B60W 2540/12* (2013.01); *B60W 2710/024* (2013.01); *B60W 2710/1005* (2013.01); *B60Y 2200/415* (2013.01); *F16D 2500/108* (2013.01); *F16D 2500/10412* (2013.01); *F16D 2500/30806* (2013.01); *F16D 2500/31426* (2013.01); *F16H 59/54* (2013.01)

(58) Field of Classification Search
CPC .......... B60W 30/18109; B60W 10/11; B60W 10/023; B60W 2710/1005; B60W 2710/024; B60W 2510/1005; B60W 2540/12; B60W 2300/17; F16D 48/06; F16D 2500/10412; F16D 2500/108; F16D 2500/31426; F16D 2500/30806; F16H 61/143
See application file for complete search history.

(56) References Cited

U.S. PATENT DOCUMENTS

| | | | |
|---|---|---|---|
| 4,095,486 A | 6/1978 | Ohnuma | |
| 4,108,022 A | 8/1978 | Arai et al. | |
| 4,422,353 A * | 12/1983 | Suga | B60W 10/06 192/3.31 |

(Continued)

FOREIGN PATENT DOCUMENTS

EP    1627763    12/2007

*Primary Examiner* — Huan Le
(74) *Attorney, Agent, or Firm* — Jeff A. Greene (57) ABSTRACT

A method for controlling an engagement of a lock-up clutch (LUC) of a torque converter of a machine is disclosed. The method includes detecting a pedal tap of a pedal, wherein the pedal tap is detected when the pedal is depressed from a position corresponding to a pedal displacement less than a first threshold displacement to a position corresponding to a pedal displacement greater than a second threshold displacement, and then released to a position corresponding to a pedal displacement less than the first threshold displacement within a threshold time duration. The method further includes causing the LUC to move to the LUC unlocked position if the pedal tap is detected.

20 Claims, 5 Drawing Sheets

(56) References Cited

U.S. PATENT DOCUMENTS

| | | | |
|---|---|---|---|
| 4,961,484 A | 10/1990 | Kato et al. | |
| 6,074,326 A | 6/2000 | Sakakibara et al. | |
| 6,102,831 A | 8/2000 | Wakahara et al. | |
| 6,551,212 B2 | 4/2003 | Skinner et al. | |
| 6,719,076 B1 | 4/2004 | Tabata et al. | |
| 7,393,299 B2 | 7/2008 | Inoue et al. | |
| 7,670,262 B2* | 3/2010 | Minaki | F16H 59/48 477/171 |
| 8,977,444 B2 | 3/2015 | Fukuhara et al. | |
| 2008/0058156 A1* | 3/2008 | Kakisaka | F16H 61/20 477/110 |
| 2018/0015928 A1* | 1/2018 | Koguchi | F16H 59/18 |

\* cited by examiner

RETARDING SYSTEM AND LOCK-UP CLUTCH ENGAGEMENT CONTROL

TECHNICAL FIELD

The present disclosure relates generally to a retarding system for a machine, and more particularly, to a retarding system that facilitates a disengagement of a lock-up clutch of a torque converter depending upon an input by an operator of the machine during an active integrated braking strategy.

BACKGROUND

Work machines such as wheel loaders, and the like, include a drivetrain to drive traction devices, such as wheels, tracks, and the like, to propel the work machine over a work surface. In one typical drivetrain arrangement, a power source, such as an internal combustion engine, is operatively connected to an automatic transmission by a torque converter. The transmission is in turn operatively connected to an axle that rotates the traction devices which propel the machine over the work surface. The torque converter is a fluid coupling that allows the power source to operate at low speeds, such as when the power source is idling, by being loosely coupled to the transmission. At higher speeds developed at the output of the power source, greater fluid pressure is developed within the torque converter. When pressurized, the fluid couples the power source to the transmission. This in turn, drives the transmission and the traction devices to propel the machine. The torque converter may include a lock-up clutch that may be locked so that a power source output shaft and a transmission input shaft rotate at the same speed, and may be unlocked to allow the shafts to rotate at different speeds.

The machine may further include braking devices which apply force to the machine components, such as an axle, on which the traction devices are mounted. The braking devices apply force to the components in response to an operator of the machine. This response could be a displacement of a floor pedal depressed by the operator's foot. The brake force reduces a ground speed of the machine over the work surface. As the ground speed of the machine is reduced, the transmission may downshift to a lower gear. In these arrangements, the lock-up clutch is unlocked, if necessary, shortly after the operator input indicates a braking request. The drivetrain provides minimal retarding force on the machine during braking, due to slippage in the torque converter. As a result, the braking devices cause a majority of the retarding of the machine. Thus, the braking devices and the engaged components of the machine may experience premature wear from heat generation associated with braking of the machine.

In some other scenarios, the lock-up clutch may remain locked even after the operator input indicates a braking request. In such cases, the transmission absorbs some of the machine's translational kinetic energy, thereby assisting in the machine retardation. However, if the machine hits a pile or an obstacle with the lock-up clutch locked, a significant amount of energy may be absorbed by the transmission and its components. Absorption of a large amount of energy by the transmission components may cause a reduction of a useful life of the transmission components.

U.S. Pat. No. 6,074,326 discloses a lock-up control system for a vehicle drivetrain with a torque converter. The lock-up control system disengages a lock-up clutch based on a deceleration of a transmission shaft, and therefore a vehicle. The lock-up control system triggers the lock-up release based on a magnitude of deceleration.

SUMMARY OF THE DISCLOSURE

In one aspect of the present disclosure, a method for controlling an engagement of a lock-up clutch (LUC) of a torque converter to assist with a motion of a machine is disclosed. The torque converter is operatively connected to a power source output shaft of a power source and a transmission input shaft of a transmission. The LUC is operatively connected to the power source output shaft and the transmission input shaft, and has a LUC unlocked position where the power source output shaft and the transmission input shaft are free to rotate relative to each other and a LUC locked position where the power source output shaft and the transmission input shaft are locked for rotation together. The method includes detecting a pedal tap of a pedal, wherein the pedal tap is detected when the pedal is depressed from a position corresponding to a pedal displacement less than a first threshold displacement to a position corresponding to a pedal displacement greater than a second threshold displacement, and then released to a position corresponding to a pedal displacement less than the first threshold displacement within a threshold time duration. The method further includes causing the LUC to move to the LUC unlocked position if the pedal tap is detected.

In another aspect of the present disclosure, a machine is disclosed. The machine includes a power source having a power source output shaft and a transmission having a transmission input shaft and a transmission output shaft. The machine further includes a torque converter operatively connected to the power source output shaft and the transmission input shaft. The machine also includes a lock-up clutch (LUC) operatively connected to the torque converter. The LUC has a LUC unlocked position where the power source output shaft and the transmission input shaft are free to rotate relative to each other, and a LUC locked position where the power source output shaft and the transmission input shaft are locked for rotation together. The machine further includes a pedal, a pedal position sensor operatively connected to the pedal to detect displacement of the pedal, and a controller operatively connected to the LUC and the pedal position sensor. The controller is configured to detect a pedal tap of the pedal, wherein the pedal tap is detected when the pedal is depressed from a position corresponding to a pedal displacement less than a first threshold displacement to a position corresponding to a pedal displacement greater than a second threshold displacement, and then released to a position corresponding to a pedal displacement less than the first threshold displacement within a threshold time duration. The controller is further configured to cause the LUC to move to the LUC unlocked position if the pedal tap is detected.

In a further aspect of the present disclosure, a retarding system for a machine is disclosed. The machine has a power source with a power source output shaft, a transmission having a transmission input shaft, a torque converter operatively connected to the power source output shaft and the transmission input shaft, and a lock-up clutch (LUC) operatively connected to the power source output shaft and the transmission input shaft. The lock-up clutch has a LUC unlocked position where the power source output shaft and the transmission input shaft are free to rotate relative to each other, and a LUC locked position where the power source output shaft and the transmission input shaft are locked for rotation together. The retarding system includes a pedal, a pedal position sensor operatively connected to the pedal to detect displacement of the pedal, and a controller operatively connected to the LUC and the pedal position sensor. The controller is configured to detect a pedal tap of the pedal, wherein the pedal tap is detected when the pedal is depressed from a position corresponding to a pedal displacement less than a first threshold displacement to a position corresponding to a pedal displacement greater than a second threshold displacement, and then released to a position corresponding to a pedal displacement less than the first threshold displacement within a threshold time duration. The controller is further configured to cause the LUC to move to the LUC unlocked position if the pedal tap is detected.

DETAILED DESCRIPTION

Figure 1:
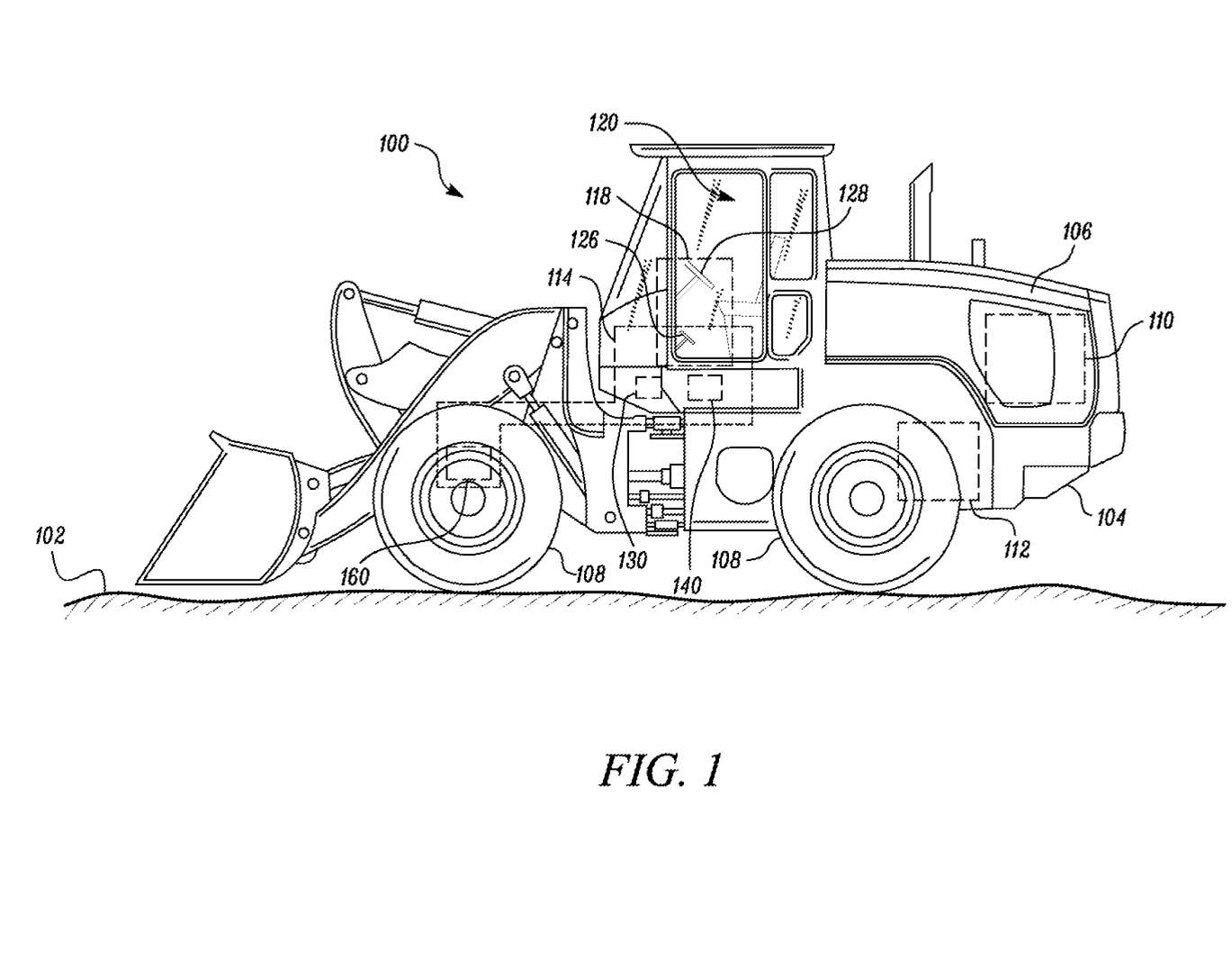
FIG. 1 is a side view of an exemplary machine that can travel over a work surface.

FIG. 1 shows an exemplary machine 100 in the form of a wheel loader that may traverse a work surface 102 at a work site. While a wheel loader is shown, any other appropriate type of work vehicle or machine that can be propelled over a work surface may also be contemplated. The machine 100 includes a frame 104 supporting a machine body 106, and with the frame 104 being supported above the work surface 102 by a plurality of traction devices 108. As illustrated, the traction devices 108 include a plurality of wheels, but the traction devices 108 may be any other appropriate devices such as an undercarriage with tracks, halftracks, or combinations of tracks, wheels, or other traction devices.

The machine 100 further includes a power source 110, a transmission 112, a retarding system 114, and a plurality of operator input devices 118. The machine 100 is driven by a drivetrain including the power source 110, such as an engine, operatively connected to the transmission 112 that in turn is operatively connected to the traction devices 108. The transmission 112 transfers power generated by the power source 110 to the traction devices 108 to rotate the traction devices 108 and propel the machine 100 over the work surface 102. The transmission 112 may be any automatic transmission having a series of gears and clutches (not shown), with the clutches selectively engaging the gears to achieve a plurality of forward and reverse drive gears having corresponding gear ratios to provide a range of speed and torque outputs necessary for the machine 100 to travel over the work surface 102 and perform work functions.

An operator can control the movement of the machine 100 along with other operations of the machine 100 at an operator station 120. The controlled operations can include speed control, braking, steering, load dumping, actuation of implements of the machine 100, and the like. The operator station 120 may include the plurality of operator input devices 118 for inputting commands for the power source 110, the transmission 112, and other systems of the machine 100. The operator input devices 118 may include one or more engine throttles, a pedal 126, one or more gear shift levers, a steering wheel 128, implement lift and articulation controls, graphical user interfaces, and the like. In an embodiment, the pedal 126 may be a brake pedal configured to facilitate a braking of the machine 100. In some implementations, the pedal 126 may also facilitate other functions, such as shifting the transmission 112 to a neutral position. In certain embodiments, the pedal 126 may be left pedal of the machine 100, such as the wheel loader. The machine 100 may further include a plurality of sensors associated with the operator input devices 118 to detect manipulation of the operator input devices 118 by an operator. For example, the machine 100 may include a pedal position sensor 130 operatively connected to the pedal 126 to detect a displacement of the pedal 126 from a free position of the pedal 126.

The machine 100 also collects and records operational data relating to the operation of the machine 100 as it operates within the work site and traverses the work surface 102. The machine 100 may include a variety of sensors 132 operating independently or as components of other control and monitoring systems to automatically monitor various operational data during travel of the machine 100 over the work surface 102 and the performance of machine operations within the work site. The sensors 132 monitoring the operational data may include speed sensors detecting machine, engine and transmission speeds, and torque sensors sensing torque at various points along the drivetrain and/or rolling resistance of the traction devices 108. Some operational data may be monitored directly, while other data may be derived or calculated from the monitored parameters. The machine 100 also includes a controller 140 such as an electronic control module (ECM) to receive information from various sensors and components of the machine 100 and control various subsystems, components of the machine 100. The controller 140 is described in detail later in the description.

Figure 2:
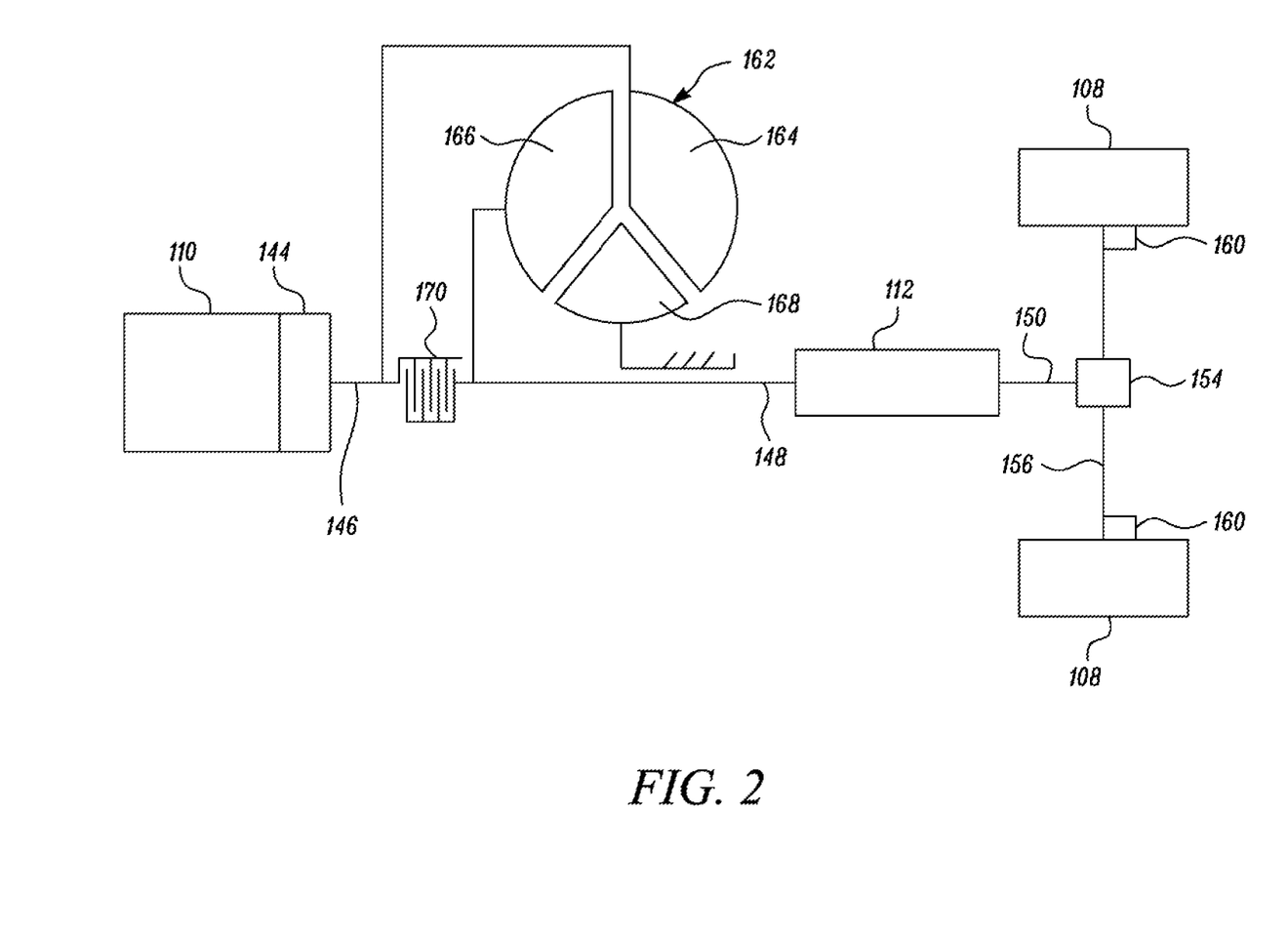
FIG. 2 is a schematic illustration of a drivetrain of the machine of FIG. 1.

FIG. 2 shows a schematic illustration of the drivetrain of the machine 100 from the power source 110 to the traction devices 108. The power source 110 may include a rotational energy storage device such as a flywheel 144, and may include a power source output shaft 146 extending therefrom. The transmission 112 includes a transmission input shaft 148 at an input end and a transmission output shaft 150 at an output end. The forward and reverse drive gears of the transmission 112 have corresponding gear ratios for transmitting the input speed and torque at the transmission input shaft 148 as a desired output speed and torque at the transmission output shaft 150. The transmission output shaft 150 may in turn be operatively connected to a differential 154 that transfers the transmission output torque to an axle 156 that is operatively connected to and propels the traction devices 108.

As shown in FIG. 2, the machine 100 further include a torque converter 162 operatively connected to a power source output shaft 146 of the power source 110 and a transmission input shaft 148 of the transmission 112. The torque converter 162 allows the power source 110 to operate at low speeds, such as when the engine is idling, without being fluidly coupled to the transmission 112. At higher speeds, the torque converter 162 serves as a fluid coupling to the transmission 112 that transfers the rotating power from the power source 110 to the transmission 112 and the traction devices 108 to propel the machine 100. The torque converter 162, as illustrated, includes an impeller 164, a turbine 166 and a stator 168. The impeller 164 is operatively connected with the power source output shaft 146, and rotates in conjunction with and at the same speed as the power source output shaft 146. The turbine 166 is operatively connected to the transmission input shaft 148 so that the transmission input shaft 148 may rotate in conjunction with and at the same speed as the turbine 166. The rotation of the impeller 164 may generate a hydrodynamic fluid coupling within the torque converter 162, and accordingly rotate the turbine 166 and the transmission input shaft 148. The stator 168 may be interposed between the impeller 164 and the turbine 166, and may positively and efficiently alter a fluid flow between the impeller 164 and the turbine 166 when necessary during operation of the machine 100. The stator 168 as illustrated is fixed in position relative to the impeller 164 and the turbine 166, but in alternative embodiments may be fixed in one direction and rotatable in the opposite direction, or be provided with a stator clutch that can be selectively engaged to alternately fix the stator 168 in place or release the stator 168 to freely rotate.

The torque converter 162 and hence the machine 100 further includes a lock-up clutch 170 that is operatively connected between the impeller 164 and the turbine 166. Further, the lock-up clutch 170 is operatively connected to the power source output shaft 146 and the transmission input shaft 148. The lock-up clutch 170 is actuatable to selectively engage and lock the impeller 164 and the turbine 166 for rotation together. The lock-up clutch 170 may be in a lock-up clutch (LUC) unlocked position at times such as during acceleration of the machine 100 where a differential rotation between the impeller 164 and the turbine 166 is desirable. Thus, in the LUC unlocked position, the power source output shaft 146 and the transmission input shaft 148 are free to rotate relative to each other i.e., the power source output shaft 146 and the transmission input shaft 148 have differential speeds of rotations. Conversely, the lock-up clutch 170 may be in a LUC locked position to physically link the impeller 164 and the turbine 166 when they are rotating close to the same speed, such as when the machine 100 is cruising at a constant speed, and thereby effectively changing the torque converter 162 into a purely mechanical coupling with no slippage and increased efficiency over hydraulic losses presented by the hydrodynamic coupling. Thus, in the LUC locked position, the power source output shaft 146 and the transmission input shaft 148 are locked for rotation together i.e., the power source output shaft 146 and the transmission input shaft 148 have same or nearly same speeds of rotations.

Referring to FIG. 1, the retarding system 114 includes the pedal 126, the pedal position sensor 130, the controller 140, and one or more brake devices 160 (shown in FIG. 2). The brake devices 160 are operatively connected to the axle 156, the traction devices 108 or other moving components of the drivetrain. The brake devices 160 are selectively actuatable in response to displacement of the pedal 126 by the operator to apply a braking/retarding force to slow the traction devices 108 and correspondingly the machine ground speed of the machine 100. In some implementations, the brake devices 160 are operatively connected to the pedal 126 by a mechanical linkage or a cable so that displacement of the pedal 126 is converted into a corresponding movement of the brake devices 160. In a hydraulic retarding system, the pedal 126 is operatively connected to a brake cylinder so that displacement of the pedal 126 increases pressure in the brake cylinder to move a piston and in turn engage the brake devices 160. The brake devices 160 may be controlled alternatively or as a supplement by the controller 140, such as in an anti-lock retarding system based on displacement of the pedal 126 detected by the pedal position sensor 130. The controller 140 is also configured to control a movement of the lock-up clutch 170 between the LUC locked position and the LUC unlocked position.

Figure 3:
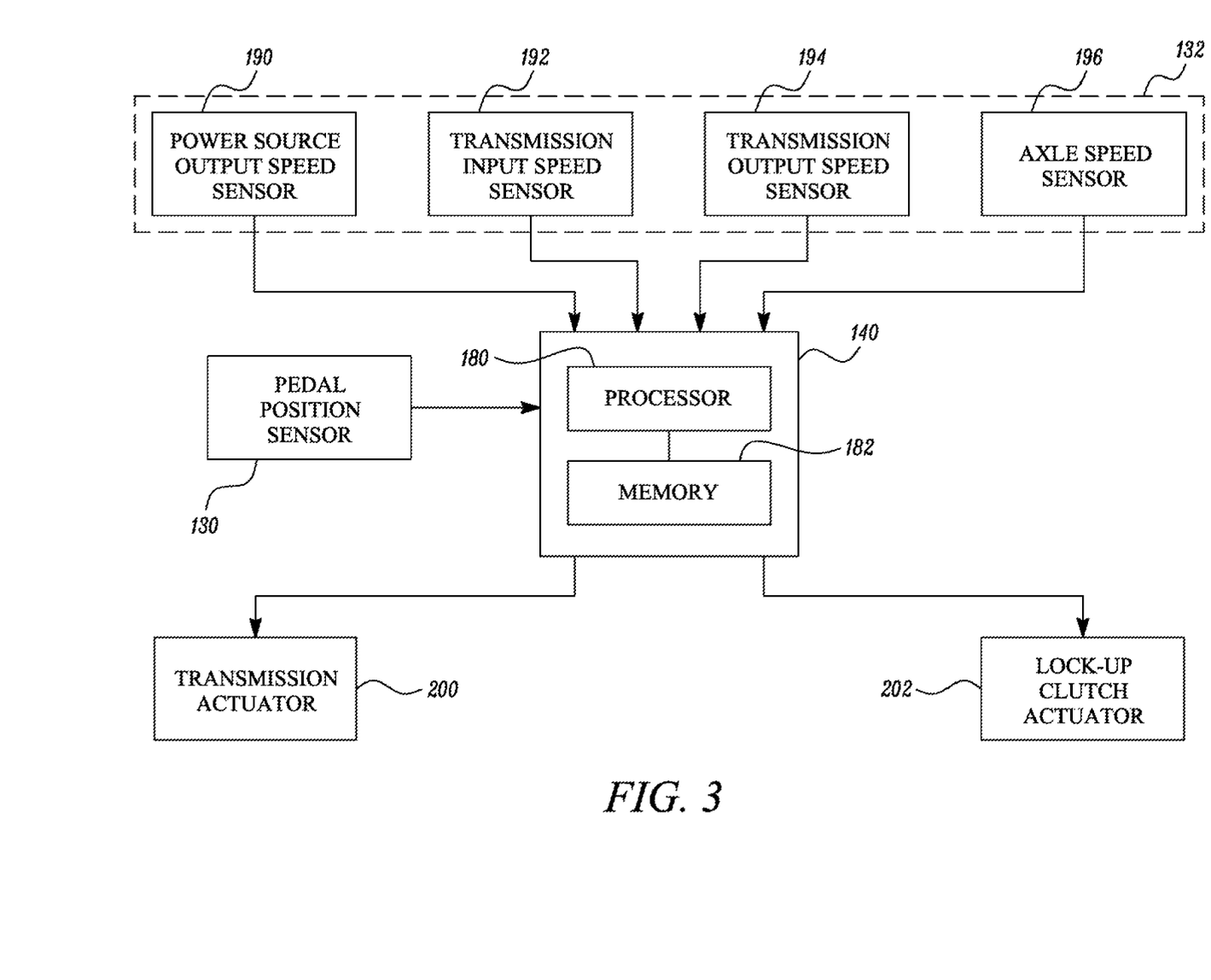
FIG. 3 is a schematic view of electrical and control components of the machine of FIG. 1.

The operator input devices 118, for example the pedal 126, the controller 140 (ECM), the pedal position sensor 130, and the sensors 132 are components of a machine control system for the machine 100. The controller 140 is operatively connected to the lock-up clutch 170, the pedal position sensor 130, and various other components and systems of the machine 100. Referring to FIG. 3, an exemplary arrangement of electrical and control components of the drivetrain of the machine 100 is shown with various control components integrated into the retarding system 114. The controller 140 may be capable of processing the information received from the operator input devices 118 such as the pedal 126, the pedal position sensor 130, and the sensors 132, and outputting command and control signals to the power source 110, the transmission 112, the lock-up clutch 170, and various actuators of the machine 100. The controller 140 may include a processor 180 for executing specified instructions, which controls and monitors various functions associated with the machine 100. The processor 180 may be operatively connected to a memory 182 for storing instructions related to the control of the machine 100 and machine components.

The memory 182 as illustrated is integrated into the controller 140, but those skilled in the art will understand that the memory 182 may be separate from the controller 140 but onboard the machine 100, and/or remote from the controller 140 and the machine 100, while still being associated with and accessible by the controller 140 to store information in and retrieve information from the memory 182 as necessary during the operation of the machine 100. Although the processor 180 is shown, it is also possible and contemplated to use other electronic components such as a microcontroller, an application specific integrated circuit (ASIC) chip, or any other integrated circuit device. While the discussion provided herein relates to the functionality of a drive control system, the controller 140 may be configured to control other aspects of the operation of the machine 100 such as, for example, dumping loads of material, actuating implements, and the like. Moreover, the controller 140 may refer collectively to multiple control and processing devices across which the functionality of the drive control system and other systems of the machine 100 may be distributed. For example, the operator station 120, the power source 110, the drive train, and the retarding system 114 may each have one or more controllers that communicate with the controller 140. Such variations in consolidating and distributing the processing of the controller 140 as described herein are contemplated as having use in braking reduction and transmission control in accordance with the present disclosure.

The sensors corresponding to the operator input devices 118 sense or detect input actions by the operator and are operatively connected to the controller 140 to transmit sensor signals having values corresponding to the input of the operator. The sensors transmit sensor signals to the controller 140 in response to the operator manipulating the operator input devices 118 in the operator station 120. For example, the pedal position sensor 130 is operatively connected to the pedal 126 to sense a displacement of the pedal 126 and transmit sensor signals having values corresponding to the amount of displacement of the pedal 126. The sensor signals may be used by the controller 140 to control the corresponding components or systems of the machine 100, such as the power source 110 or the brake devices 160, or to perform further processing related to the operation and control of other components and systems that may be dependent on the displacement of the pedal 126 such as control of the transmission 112 and the lock-up clutch 170 as discussed further below.

The sensors 132 may include a power source output speed sensor 190, a transmission input speed sensor 192, a transmission output speed sensor 194 and an axle speed sensor 196, among other speed sensing devices. The power source output speed sensor 190 is operatively connected to the power source output shaft 146 and transmits power source output speed signals with values indicating the rotational speed of the power source output shaft 146 and the impeller 164. The transmission input speed sensor 192 is operatively connected to the transmission input shaft 148 and transmits transmission input speed signals with values indicating the rotational speed of the transmission input shaft 148 and the turbine 166. The transmission output speed sensor 194 is operatively connected to the transmission output shaft 150 and transmits transmission output speed signals with values indicating the rotational speed of the transmission output shaft 150. The axle speed sensor 196 is operatively connected to the axle 156 and transmits axle speed signals with values indicating the rotational speed of the axle 156 and the traction devices 108.

The transmission 112 may include a transmission actuator or actuators 200 that operate to engage and disengaged the clutches of the transmission 112 to shift between the available gears and corresponding gear ratios as the output speed of the power source 110 and the ground speed of the machine 100 increase and decrease in response to the operator manipulation of the operator input devices 118. A transmission upshift schedule may be stored in the memory 182 and accessed by the controller 140 to determine when to upshift from one gear to the next higher gear at the appropriate time to maximize the performance of the machine 100. The transmission upshift schedule may include portions for each upshift that is performed by the transmission 112 (1-2, 2-3, 3-4, etc.). The controller 140 may use inputs such as the power source output speed from the power source output speed sensor 190, and the transmission output speed from the transmission output speed sensor 194 or the axle speed from the axle speed sensor 196 from which the machine ground speed can be derived, in conjunction with the transmission upshift schedule to determine when to upshift to the next gear. A transmission downshift schedule may also be stored in the memory 182 and used by the controller 140 to determine when to downshift from one gear to the next lower gear at the appropriate time. The transmission downshift schedule may also include portions for each downshift, and the controller 140 may use similar sensed speed to determine when to transmit control signals to the transmission actuators 200 to execute the downshift. The controller 140 may also use the displacement of the pedal 126 from the pedal position sensor 130 in determining when to cause the transmission actuators 200 to perform the downshift. The transmission downshift schedule is discussed further below in conjunction with an integrated braking strategy for executing a braking reduction and transmission control.

A lock-up clutch (LUC) actuator 202, such as an electronic clutch pressure control (ECPC) valve, controls the locking and unlocking of the lock-up clutch 170. An ECPC valve is exemplary only, and the lock-up clutch 170 may be controlled by any appropriate clutch actuator mechanism. The controller 140 is configured to transmit LUC control signals to the LUC actuator 202 to move the lock-up clutch 170 between the LUC locked position and the LUC unlocked position. When the machine 100 reaches a cruising speed and the controller 140 determines that the impeller 164 and the turbine 166 are rotating at approximately the same speed, the controller 140 may transmit LUC control signals to the LUC actuator 202 to set the lock-up clutch 170 in the LUC locked position for direct drive of the transmission input shaft 148 by the power source output shaft 146. When the operating conditions indicate that high torque loads are or will be experienced or other factors causing the machine 100 to slow down exist, the controller 140 transmits LUC control signals to the LUC actuator 202 to unlock the lock-up clutch 170. Further, the controller 140 is configured to transmit control signals to the LUC actuator 202 to unlock the lock-up clutch 170 in response to displacement of the pedal 126. The response of the controller 140 to displacement of the pedal 126 to cause the LUC actuator 202 to unlock the lock-up clutch 170 as part of the integrated braking strategy for executing the braking reduction and transmission control is discussed further below.

Figure 4:
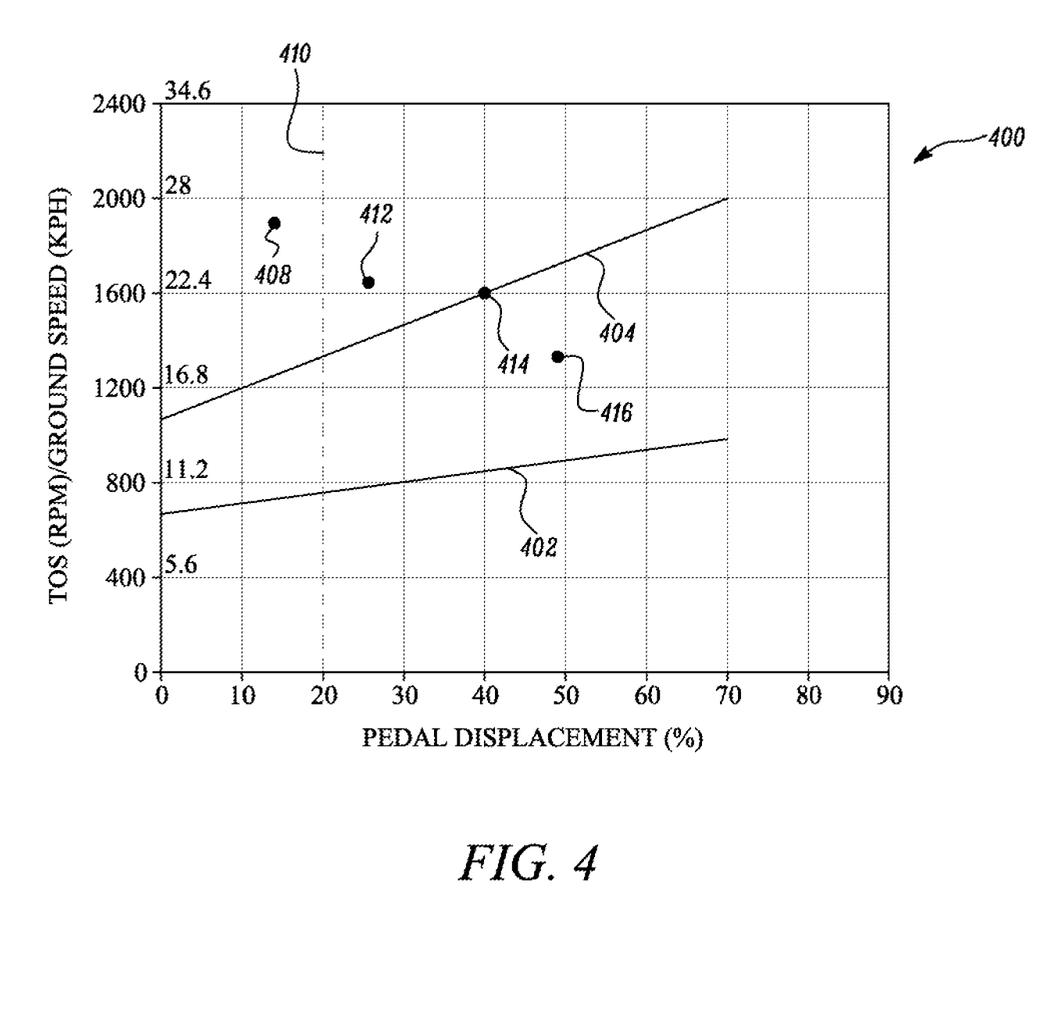
FIG. 4 is a graph of pedal displacement versus transmission output speed/ground speed with an exemplary transmission downshift schedule of a transmission of the machine of FIG. 1.

FIG. 4 presents a graph 400 showing a portion of an exemplary transmission downshift schedule for the machine 100 used for performing the integrated braking strategy. The X-axis of the graph 400 represents the pedal displacement expressed as a percentage of a maximum pedal displacement. The Y-axis represents the transmission output speed (TOS) in revolutions per minute and/or the machine ground speed in kilometers per hour. A first line 402 on the graph 400 represents a portion of the transmission downshift schedule for downshifting from third gear to second gear, and a second line 404 represents a portion of the transmission downshift schedule for downshifting from fourth gear to third gear. The lines 402, 404 are exemplary only, and the transmission downshift schedule graph 400 may vary based on the operating requirements for a particular machine 100.

In general, for a given gear, a downshift will occur when the combination of a current pedal displacement and a current machine ground speed crosses the corresponding line 402, 404 from above and to the left of the line 402, 404 to below and to the right of the line 402, 404. Using the fourth gear line 404 as an example, when the pedal 126 is not displaced, a downshift will be executed when the transmission output speed drops below 1,200 rpm and/or the machine ground speed drops below 16.8 kmph (10.44 mph). As the pedal 126 is displaced, the transmission output speed or the machine ground speed remains the same initially. A downshift does not occur at a point 408 above and to the left of the line 404. The point 408 is within a dead band of brake actuation below a pedal displacement line 410 where the pedal 126 is displaced but the brake devices 160 are not yet applying a brake force to the traction devices 108. A second point 412 is beyond the dead band, but the machine 100 has not slowed to a transmission output speed or a machine ground speed that will trigger a downshift to third gear.

As the pedal displacement and the brake force increase, the transmission output speed, and the machine ground speed decreases until the combination intersects the line 404 at a point such as point 414. At the point 414, the controller 140 determines that the downshift to third gear should occur, and transmits control signals to the transmission actuators 200 to cause the transmission clutches to shift the transmission 112 to third gear. As the pedal displacement further increases, the transmission output speed and the machine ground speed decrease such that the combination reaches a point such as the point 416 that is below and to the right of the line 404. At that point, the controller 140 transmits transmission control signals to cause the transmission actuators 200 to downshift the transmission 112 to third gear and then begin to evaluate the pedal displacement and the transmission output speed and machine ground speed against the third gear portion of the transmission downshift schedule represented by the line 402.

Further, when the integrated braking strategy is active, the drivetrain is used to assist in slowing the machine 100 when the operator displaces the pedal 126 by keeping the lock-up clutch 170 into the locked position until the operating conditions indicate that the transmission 112 is going to downshift. For example, using fourth gear line 402, the controller 140 is configured to keep the lock-up clutch 170 locked until the combination of the pedal displacement and the current machine speed reaches the line 402 from above and to the left of the line 402. Thus, according to the integrated braking strategy, in response to the combination of the pedal displacement and the current machine speed reaching the line 402 from above and left of the line 402, the controller 140 is configured to transmit an LUC control signal to the LUC actuator 202 to move the lock-up clutch 170 to the unlocked position. This allows the drivetrain to stay in direct drive longer and provide increased retarding that reduces the wear and heating of the brake devices 160, the axle 156 and the traction devices 108.

However, during certain operating scenarios, it is desirable to move the lock-up clutch 170 to the unlocked position to avoid the machine 100 hitting a pile with the lock-up clutch 170 engaged. To enable unlocking of the lock-up clutch 170, the controller 140 may include an overriding strategy to override or bypass the integrated braking strategy and move the lock-up clutch 170 to the unlocked position before the lock-up clutch 170 is moved to the unlocked position as per the integrated braking strategy. The controller 140 is configured to override the integrated braking strategy in response to detection of an operator input when the integrated brake strategy is active. The operator input is determined by the controller 140 when the operator performs/executes a pedal tap by depressing the pedal 126. The controller 140 detects the pedal tap when the pedal 126 is depressed from a position corresponding to a pedal displacement less than a first threshold displacement to a position corresponding to a pedal displacement greater than a second threshold displacement, and then released to a position corresponding to a pedal displacement less than the first threshold displacement within a threshold time duration. In response to detection of the pedal tap, the controller 140 causes the lock-up clutch 170 to move to the LUC unlocked position.

INDUSTRIAL APPLICABILITY

Figure 5:
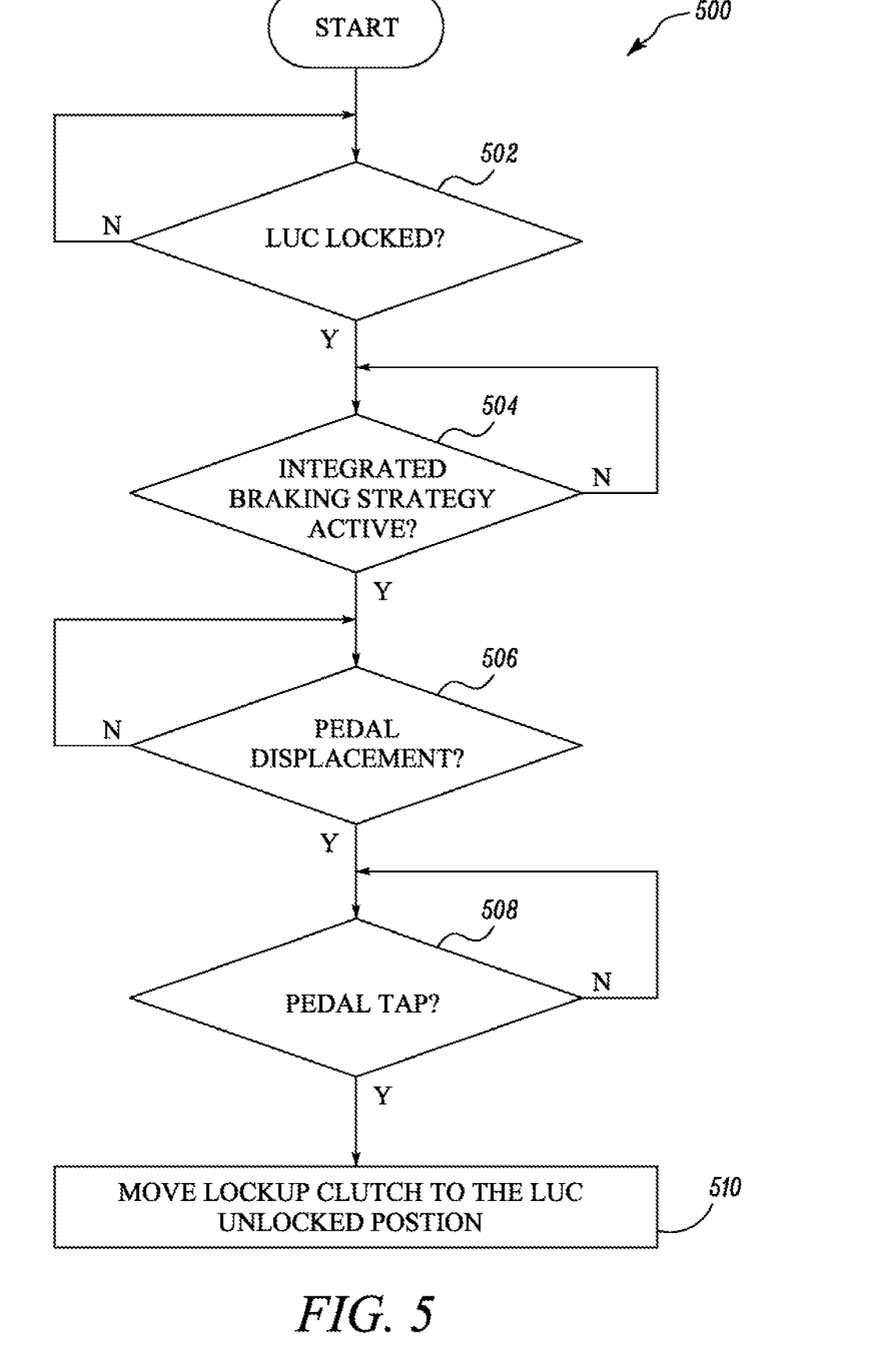
FIG. 5 is a flow diagram of a lock-up clutch unlocking routine in accordance with the present disclosure that may be executed by a controller of the machine of FIG. 1.

FIG. 5 is a flow diagram for a LUC unlocking routine 500 that may be stored in the memory 182 and executed by the controller 140 to control the unlocking of the lock-up clutch 170 as per the braking reduction and the transmission control. The routine 500 may use the pedal displacement as the operator input to override the integrated braking strategy and unlock the lock-up clutch 170 so that the transmission 112 and associated components do not absorb a significant amount of energy during braking—therefore preventing a premature failure of transmission 112 and associated components.

The routine 500 may begin at a block 502 where the controller 140 determines whether the lock-up clutch 170 is locked i.e. in the LUC locked position. As discussed previously, the controller 140 may transmit LUC control signals to the LUC actuator 202 to move the lock-up clutch 170 to the LUC locked position when the transmission input speed is approximately equal to the power source output speed. The controller 140 may maintain a LUC status indicating whether the lock-up clutch 170 is in the LUC locked position or the LUC unlocked position, or may determine the current state of the lock-up clutch 170 during execution of the routine 500. If the controller 140 determines that the lock-up clutch 170 is in the LUC unlocked position at the block 502, control may return to the start of the routine 500 until the lock-up clutch 170 is locked for direct drive of the transmission 112. Of course, those skilled in the art will understand that the comparison at the block 502 may be omitted, and the controller 140 may perform the processing described below continuously as the machine 100 is operated.

If the controller 140 determines that the lock-up clutch 170 is locked at the block 502, or if the block 502 is omitted, control passes to a block 504 where the controller 140 determines whether the integrated braking strategy is active. In certain implementations, the integrated braking strategy is universally active. In such cases, the block 504 may be omitted. In certain implementations, the integrated braking strategy may be disabled by an operator manually. In such a case, the controller 140 may determine if the integrated braking strategy is active or inactive. The controller 140 may store a status of the integrated braking strategy in the memory 182. If the controller 140 determines that the integrated braking strategy is inactive, control may return to the start of the block 504 or at the start of the routing 500.

If the controller 140 determines that the integrated braking strategy is active at the block 504, control passes to a block 506. At the block 506, the controller 140 evaluates pedal displacement signals from the pedal position sensor 130 to determine whether the operator is depressing the pedal 126. If the pedal displacement signals indicate no pedal displacement from the free position of the pedal 126, the operator is not commanding brake force to slow the machine 100. In this case, control may pass back to the start of the block 506 to continue monitoring the pedal displacement signals for operator input. If the controller 140 determines that the pedal 126 is being displaced by the operator at the block 506, control may pass to a block 508 where the controller 140 may determine whether the pedal displacement signals indicate that the pedal tap is executed by the operator. If the controller 140 determines no pedal tap then control moves back to the start of the block 508 to continue monitoring the pedal tap.

Also, if the controller 140 does not detect the pedal tap, the controller 140 is configured to control the transmission 112 and the lock-up clutch 170 as per the integrated braking strategy, as explained previously. Thus, the controller 140 may keep the lock-up clutch 170 in the LUC locked position until the combination of the pedal displacement and the current machine speed is such that a downshift can occur. Once the combination of the pedal displacement and the current machine speed reaches to a certain point corresponding to a downshift schedule for a current gear ratio of the transmission 112, for example the point 414 as per the downshift schedule of the fourth gear, then the controller 140 provides signals to the LUC actuator 202 to move the lock-up clutch 170 to the LUC unlocked position. Therefore, the controller 140 may detect a current gear ratio of the transmission 112 and may cause a downshifting of the transmission 112 by comparing a combination of the current machine speed and the pedal displacement to the transmission downshift schedule for the current gear ratio. The controller 140 determines the current transmission gear so that the correct portion of the transmission downshift schedule can be used in deciding whether to unlock the lock-up clutch 170. In response to the signals from the controller 140, the LUC actuator 202 may move the lock-up clutch 170 to the LUC unlocked position.

The controller 140 determines the pedal tap when the pedal 126 is depressed from a position corresponding to a pedal displacement less than the first threshold displacement to a position corresponding to a pedal displacement greater than the second threshold displacement and then released to a position corresponding to a pedal displacement less than the first threshold displacement within a threshold time duration. In some implementations, the first threshold displacement refers to a displacement of the pedal 126 corresponding to an upper limit of the pedal displacement of the dead band. The upper limit is represented by the pedal displacement line 410 (shown in FIG. 4). Thus, the position of the pedal 126 corresponding to a pedal displacement less than the first threshold displacement refers to a position of pedal within the dead band. In an example, the first threshold displacement may correspond to ten percent of a total displacement of the pedal 126 from a free position of the pedal 126. Further, in an embodiment, the second threshold displacement may correspond to ninety percent of the total displacement of the pedal 126 from the free position of the pedal 126. For example, if a total pedal displacement (i.e. a maximum pedal displacement) of the pedal 126 is X, then the first threshold displacement corresponds to 0.1× pedal displacement from the free position of the pedal 126 and the second threshold displacement corresponds to 0.9× pedal displacement from the free position of the pedal 126. It will be appreciated that these above noted values are exemplary, and a variety of values may be contemplated to define the first threshold displacement and the second threshold displacement. Further, in an embodiment, the threshold time duration may exemplarily range between one to three seconds. In an embodiment, the threshold time duration is one second. Further, the values of the first threshold displacement, the second threshold displacement, and the threshold time duration may be stored in the memory 182.

In an exemplary scenario, the total pedal displacement (i.e. maximum pedal displacement) is ten centimeters, the first threshold displacement is one centimeter, the second threshold displacement is nine centimeters, and the threshold time duration is one second. The operator may depress the pedal 126 from a free position of the pedal 126 i.e. a position of the pedal 126 in which pedal displacement is zero centimeter to a position in which the pedal displacement is 9.5 centimeter and then release the pedal 126 to allow the pedal 126 to either return to the free position or a position in which the pedal displacement is less than one centimeter from the free position. In such a case, the controller 140 detects the pedal tap if the time duration that had elapsed in pressing the pedal 126 from free position to the position corresponding to 9.5 centimeter of the pedal displacement and then return of the pedal 126 to the free position or position in which the pedal displacement is less than one centimeter from the free position is less than one second. After detecting the pedal tap at the block 508, control moves to the block 510.

At the block 510, the controller 140 transmits LUC control signals to the LUC actuator 202 to disengage and unlock the lock-up clutch 170 and allows the power source output shaft 146 and the transmission input shaft 148 to rotate at different speeds. In this manner the controller 140 overrides the integrated braking strategy upon receiving an operator input in the form of the pedal tap and moves the lock-up clutch 170 to the LUC unlocked position. As a result, an absorption of significant amount of energy by the transmission 112 is avoided relative to absorption of energy by hitting the pile or an obstacle with the lock-up clutch 170 engaged until the downshift conditions are met—therefore preventing a premature failure of transmission 112 and associated components. Therefore, the present disclosure provides the operator a means of manually disengaging a lock-up clutch in order to improve performance of a machine and/or reduce wear under circumstances where an automatic lock-up clutch control strategy prevents or delays unlocking/disengagement of the lock-up clutch.

What is claimed is:

1. A method for controlling an engagement of a lock-up clutch (LUC) of a torque converter to assist with a motion of a machine, where the torque converter is operatively connected to a power source output shaft of a power source and a transmission input shaft of a transmission, and the LUC is operatively connected to the power source output shaft and the transmission input shaft, and has a LUC unlocked position where the power source output shaft and the transmission input shaft are free to rotate relative to each other and a LUC locked position where the power source output shaft and the transmission input shaft are locked for rotation together, the method comprising:

detecting a pedal tap of a pedal, wherein the pedal tap is detected when the pedal is depressed from a position corresponding to a pedal displacement less than a first threshold displacement to a position corresponding to a pedal displacement greater than a second threshold displacement, and then released to a position corresponding to a pedal displacement less than the first threshold displacement within a threshold time duration; and causing the LUC to move to the LUC unlocked position if the pedal tap is detected.

2. The method of claim 1 further including determining if an integrated braking strategy is active or inactive, and override the integrated braking strategy, if the integrated braking strategy is active based on detection of the pedal tap.

3. The method of claim 2, wherein the integrated braking strategy includes downshifting of the transmission by comparing a combination of a current machine speed and a pedal displacement to a transmission downshift schedule.

4. The method of claim 3 further including detecting a current gear ratio of the transmission and causing a downshifting of the transmission by comparing the combination of the current machine speed and the pedal displacement to the transmission downshift schedule for the current gear ratio.

5. The method of claim 1, wherein the first threshold displacement of the pedal corresponds to a ten percent of a total displacement of the pedal.

6. The method of claim 1, wherein the second threshold displacement of the pedal corresponds to a ninety percent of a total displacement of the pedal.

7. The method of claim 1, wherein the threshold time duration is one second.

8. A machine comprising:

a power source having a power source output shaft;
   a transmission having a transmission input shaft and a transmission output shaft;
   a torque converter operatively connected to the power source output shaft and the transmission input shaft;
   a lock-up clutch (LUC) operatively connected to the torque converter, the LUC having a LUC unlocked position where the power source output shaft and the transmission input shaft are free to rotate relative to each other and a LUC locked position where the power source output shaft and the transmission input shaft are locked for rotation together;

a pedal;

a pedal position sensor operatively connected to the pedal to detect displacement of the pedal; and a controller operatively connected to the LUC and the pedal position sensor, the controller configured to:

detect a pedal tap of the pedal, wherein the pedal tap is detected when the pedal is depressed from a position corresponding to a pedal displacement less than a first threshold displacement to a position corresponding to a pedal displacement greater than a second threshold displacement, and then released to a position corresponding to a pedal displacement less than the first threshold displacement within a threshold time duration, and     cause the LUC to move to the LUC unlocked position if the pedal tap is detected.

9. The machine of claim 8, wherein the controller is further configured to determine if an integrated braking strategy is active or inactive, and override the integrated braking strategy, if the integrated braking strategy is active based on detection of the pedal tap.

10. The machine of claim 9, wherein the integrated braking strategy includes downshifting of the transmission by comparing a combination of a current machine speed and a pedal displacement to a transmission downshift schedule.

11. The machine of claim 10, wherein the controller is configured to detect a current gear ratio of the transmission and cause a downshifting of the transmission by comparing the combination of the current machine speed and the pedal displacement to the transmission downshift schedule for the current gear ratio of the transmission.

12. The machine of claim 8, wherein the first threshold displacement of the pedal corresponds to a ten percent of a total displacement of the pedal.

13. The machine of claim 8, wherein the second threshold displacement of the pedal corresponds to a ninety percent of a total displacement of the pedal.

14. The machine of claim 8, wherein the threshold time duration is one second.

15. A retarding system for a machine having a power source with a power source output shaft, a transmission having a transmission input shaft, a torque converter operatively connected to the power source output shaft and the transmission input shaft, and a lock-up clutch (LUC) operatively connected to the power source output shaft and the transmission input shaft and having a LUC unlocked position where the power source output shaft and the transmission input shaft are free to rotate relative to each other and a LUC locked position where the power source output shaft and the transmission input shaft are locked for rotation together, the retarding system comprising:

a pedal;

a pedal position sensor operatively connected to the pedal to detect displacement of the pedal; and a controller operatively connected to the LUC and the pedal position sensor, the controller is configured to     detect a pedal tap of the pedal, wherein the pedal tap is detected when the pedal is depressed from a position corresponding to a pedal displacement less than a first threshold displacement to a position corresponding to a pedal displacement greater than a second threshold displacement, and then released to a position corresponding to a pedal displacement less than the first threshold displacement within a threshold time duration, and     cause the LUC to move to the LUC unlocked position if the pedal tap is detected.

16. The retarding system of claim 15, wherein the controller is further configured to determine if an integrated braking strategy is active or inactive, and override the integrated braking strategy, if the integrated braking strategy is active based on detection of the pedal tap.

17. The retarding system of claim 16, wherein the controller is configured to detect a current gear ratio of the transmission and cause a downshifting of the transmission by comparing a combination of a current machine speed and a pedal displacement to a transmission downshift schedule for the current gear ratio of the transmission when the integrated braking strategy is active.

18. The retarding system of claim 15, wherein the first threshold displacement of the pedal corresponds to a ten percent of a total displacement of the pedal.

19. The retarding system of claim 15, wherein the second threshold displacement of the pedal corresponds to a ninety percent of a total displacement of the pedal.

20. The retarding system of claim 15, wherein the threshold time duration is one second.

* * * * *